(12) United States Patent
Auch et al.

(10) Patent No.: US 9,807,168 B2
(45) Date of Patent: Oct. 31, 2017

(54) DISTRIBUTED SHARED LOG FOR MODERN STORAGE SERVERS

(71) Applicants: Nathan Auch, Waterloo (CA); Peter Bumbulis, Kitchener (CA); Anil Goel, Waterloo (CA); Jeffrey Pound, Kitchener (CA)

(72) Inventors: Nathan Auch, Waterloo (CA); Peter Bumbulis, Kitchener (CA); Anil Goel, Waterloo (CA); Jeffrey Pound, Kitchener (CA)

(73) Assignee: SAP SE, Walldorf (DE)

( * ) Notice: Subject to any disclaimer, the term of this patent is extended or adjusted under 35 U.S.C. 154(b) by 383 days.

(21) Appl. No.: 14/684,132

(22) Filed: Apr. 10, 2015

(65) Prior Publication Data

US 2016/0301753 A1    Oct. 13, 2016

(51) Int. Cl.
*G06F 15/16*     (2006.01)
*H04L 29/08*    (2006.01)
*G06F 15/167*   (2006.01)

(52) U.S. Cl.
CPC ........ *H04L 67/1097* (2013.01); *G06F 15/167* (2013.01)

(58) Field of Classification Search
CPC ............................ H04L 67/1097; G06F 15/167
See application file for complete search history.

(56) References Cited

U.S. PATENT DOCUMENTS

| 7,801,848 B2* | 9/2010 | Hazlewood ....... | G06F 17/30584 707/609 |
| 7,925,704 B2* | 4/2011 | Keller ..................... | H04L 51/12 379/142.05 |
| 9,262,430 B2* | 2/2016 | Tal ..................... | G06F 17/30156 |
| 2005/0246344 A1* | 11/2005 | Keller ..................... | H04L 51/12 |

OTHER PUBLICATIONS

Redis webpage, http://redis.io.
Balakrishnan, Mahesh, et al., "CORFU: A Shared Log Design for Flash Clusters," Proceedings of the 9th USENIX Conference on Networked Systems Design and Implementation, NSDI'12, USENIX Association, 2012, 14 pages.

(Continued)

*Primary Examiner* — Moustafa M Meky
(74) *Attorney, Agent, or Firm* — Sterne, Kessler, Goldstein & Fox, PLLC (57) ABSTRACT

Disclosed herein are system, method, and computer program product embodiments for accessing a distributed shared log that supports a total order over log writes and multiple logical log streams. An embodiment operates by selecting a range of log entries for a logical log stream from the distributed shared log and mapping the selected range of log entries to associated storage units in a plurality of storage units. The selected range of log entries are stored at the associated storage units according to metadata that indexes the selected range of log entries by logical log stream. The selected range of log entries are then requested from the associated storage units based on the mapping. The selected range of log entries for the logical log stream are then returned from the associated storage units based on a scan of the metadata. The received log entries are then reassembled.

23 Claims, 8 Drawing Sheets

(56) References Cited

OTHER PUBLICATIONS

Balakrishnan, Mahesh, et al., "Tango: Distributed Data Structures Over a Shared Log," Proceedings of the Twenty-Fourth ACM Symposium on Operating Systems Principles, SOSP '13, ACM, 2013, 16 pages.
Bonwick, Jeff, "Space Maps," Jeff Bonwick's Blog, https://blogs.oracle.com/bonwick/en/entry/space_maps, Sep. 13, 2007, 7 pages.
Hunt, Patrick, et al., "ZooKeeper: Wait-free coordination for Internet-scale systems," USENIX Annual Technical Conference, 2010, vol. 8, 9 pages.
Junqueira, Flavio P., et al., "Durability with BookKeeper," ACM SIGOPS Operating Systems Review, 2013, vol. 47, No. 1, 7 pages.
Kadekodi, Saurabh, et al., "Taking Linux Filesystems to the Space Age: Space Maps in Ext4," Linux Symposium, 2010, 14 pages.
Kreps, Jay, et al., "Kafka: A Distributed Messaging System for Log Processing," Proceedings of the NetDB, 2011, 7 pages.
Lamport, Leslie, et al., "Vertical Paxos and Primary-Backup Replication," Proceedings of the 28th ACM symposium on Principles of distributed computing, ACM, 2009, 14 pages.
Terrace, Jeff, et al., "Object Storage on CRAQ: High-throughput chain replication for read-mostly workloads," USENIX Annual Technical Conference, 2009, 16 pages.

\* cited by examiner

DISTRIBUTED SHARED LOG FOR MODERN STORAGE SERVERS

BACKGROUND

A distributed shared log is a data structure designed to provide durable ordered writes as a remote network service while allowing concurrent clients to both read and write to the log. On commodity hardware, slow networks and spinning disks make a distributed shared log too slow for high performance applications like a transactional database. But advances in new hardware such as low-latency high bandwidth networks, solid-state hard drives with low-latency reads and writes, and non-volatile Random Access Memory (RAM) make remotely hosted distributed storage tiers feasible for high performance data intensive applications. This high read and write throughput is often accomplished by providing multiple logical log streams. But while distributed shared logs have become feasible for high performance data intensive applications by providing multiple logical log streams, they do not retain a total global order over writes. This limits the use of a distributed shared log for many high performance applications like a transactional database.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for utilizing a distributed shared log that combines a total order over log writes with multiple logical log streams. An embodiment operates by a client selecting a range of log addresses for a logical log stream from a distributed shared log that utilizes a global logical log address space. The selected range of log addresses are mapped to associated storage units. The selected range of log addresses is requested from the associated storage units based on the mapping. The associated storage units provide the log entries that correspond to the selected range of log addresses for the logical log stream. The associated storage units perform this by scanning metadata based on the selected range of log addresses and the logical log stream. The client then reassembles the received log entries.

Figure 1:
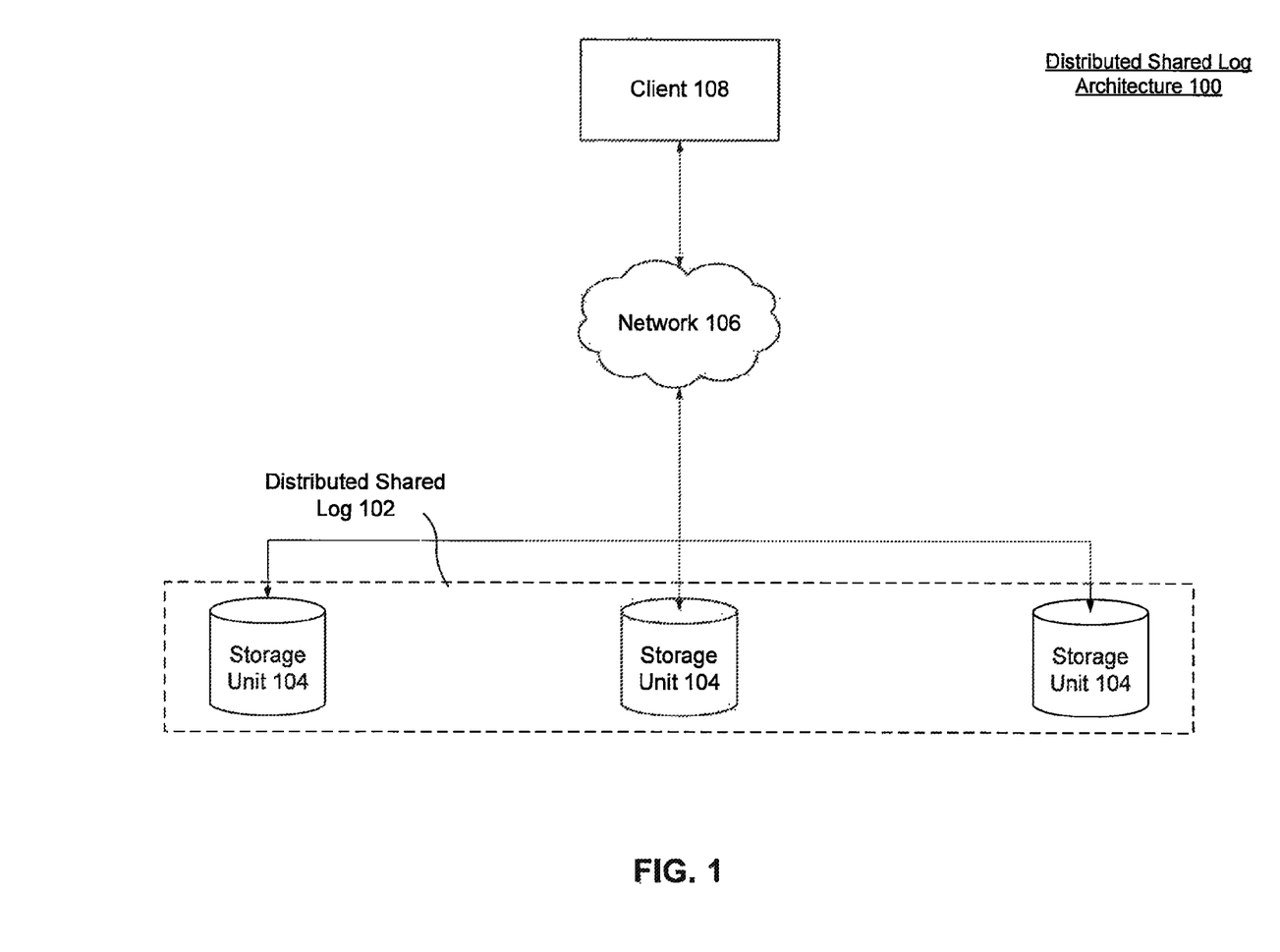
FIG. 1 is a block diagram of a distributed shared log architecture that supports a total order over log writes and multiple logical log streams, according to an example embodiment.

FIG. 1 is a block diagram of a distributed shared log architecture 100 that supports a total order over log writes and multiple logical log streams, according to an example embodiment. Distributed shared log architecture 100 includes a distributed shared log 102, one or more storage units 104, network 106, and client 108.

Distributed shared log 102 is a data structure that records events (e.g. changes) to one or more objects. Distributed shared log 102 may function as a database commit log, a persistent message queue, or a reliable atomic broadcast mechanism.

Distributed shared log 102 may be stored on one or more storage units 104. Client 108 may be read from or written to distributed shared log 102 by respectively submitting read or write requests to storage units 104 over network 106. As would be appreciated by a person of ordinary skill in the art, multiple clients may read or write to distributed shared log 102.

Storage units 104 may have multicore Central Processing Units (CPUs) and large main-memories. Network 106 may be a LAN (Local Area Network), WAN (Wide Area Network) or the Internet. Clients 108 may submit read or write requests to storage units 104 over network 106 using Transmission Control Protocol/Internet Protocol (TCP/IP).

Distributed shared log 102 may have several properties. First, distributed shared log 102 may provide high read and write throughput while retaining a total order over log writes. Second, distributed shared log 102 may provide durable log writes such that data can be properly recovered in a disaster scenario, e.g. a power failure. Third, distributed shared log 102 may provide atomic log writes such that a log write completes in its entirety or not at all. Finally, distributed shared log 102 may allow concurrent reads and writes from multiple clients.

Distributed shared log 102 may comprise a number of log entries. Each log entry may have a global logical log address and each log entry may record information about events to one or more objects at a given time. In an embodiment, the log entries are totally ordered across log streams. In an embodiment, a "total ordering across log streams" is a relation over log entries that enables client 108 or storage units 104 to determine whether an event to an object in one log entry comes before or after an event to a different object in a different log entry. This ensures that changes to one or more objects are replayed in the same order as written to the log. The log entries may be retrieved for recovery purposes (e.g. rollback operations), security purposes (e.g. identifying illegal operations performed by unauthorized users), or any other purpose that requires access to previously processed operations.

Figure 2:
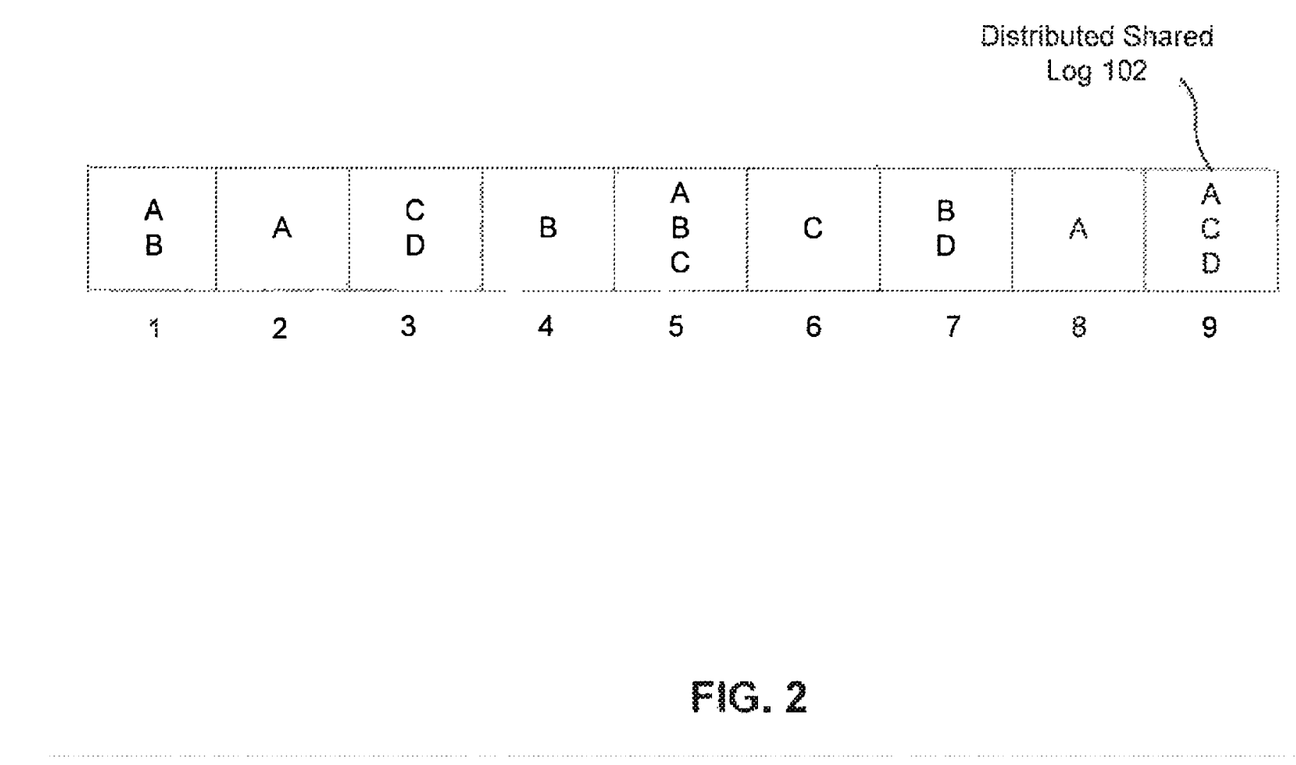
FIG. 2 illustrates an example of log entries in a distributed shared log, according to the example embodiment in FIG. 1.

FIG. 2 illustrates an example of nine log entries in distributed shared log 102, according to the example embodiment in FIG. 1. In this non-limiting example, the nine log entries in distributed shared log 102 are totally ordered. For example, log entry 1 has a global logical log address of 1 and is the oldest log entry. Log entry 1 records events to objects A and B at a given time. Log entry 9 has a global logical log address of 9 and is the most recent log entry. Log entry 9 records events to objects A, C and D at a different time. Because distributed shared log 102 is totally ordered, client 108 will process the events to objects A, C and D in log entry 9 after the events to objects A and B in log entry 1. Client 108 will, however, process the events to objects A and B in log entry 1 at the same time.

Distributed shared log 102 may be stored across one or more storage units 104. In an embodiment, the log entries of distributed shared log 102 may be striped across storage units 104. In an embodiment, "striping" is the segmentation, of log entries for storage on different storage units 104. In an embodiment, "striping" may involve the segmentation of logically sequential log entries such that consecutive log entries are stored on different storage units 104. In another embodiment, "striping" may be done range wise. For example, log entries for logical log addresses 0-100 may be stored on one storage unit 104, while log entries for logical log addresses 200-300 may be on another storage unit 104. However, while the log entries may be striped across one or more storage units 104, client 108 accesses distributed shared log 102 as a single globally addressable log. Specifically, client 108 may access the log entries in distributed shared log 102 as part of a single global logical log address space with each log entry having a unique log address. Because the log entries in distributed shared log 102 are part of a single global logical log address space, distributed shared log 102 may retrain a total ordering over log writes.

Figure 3:
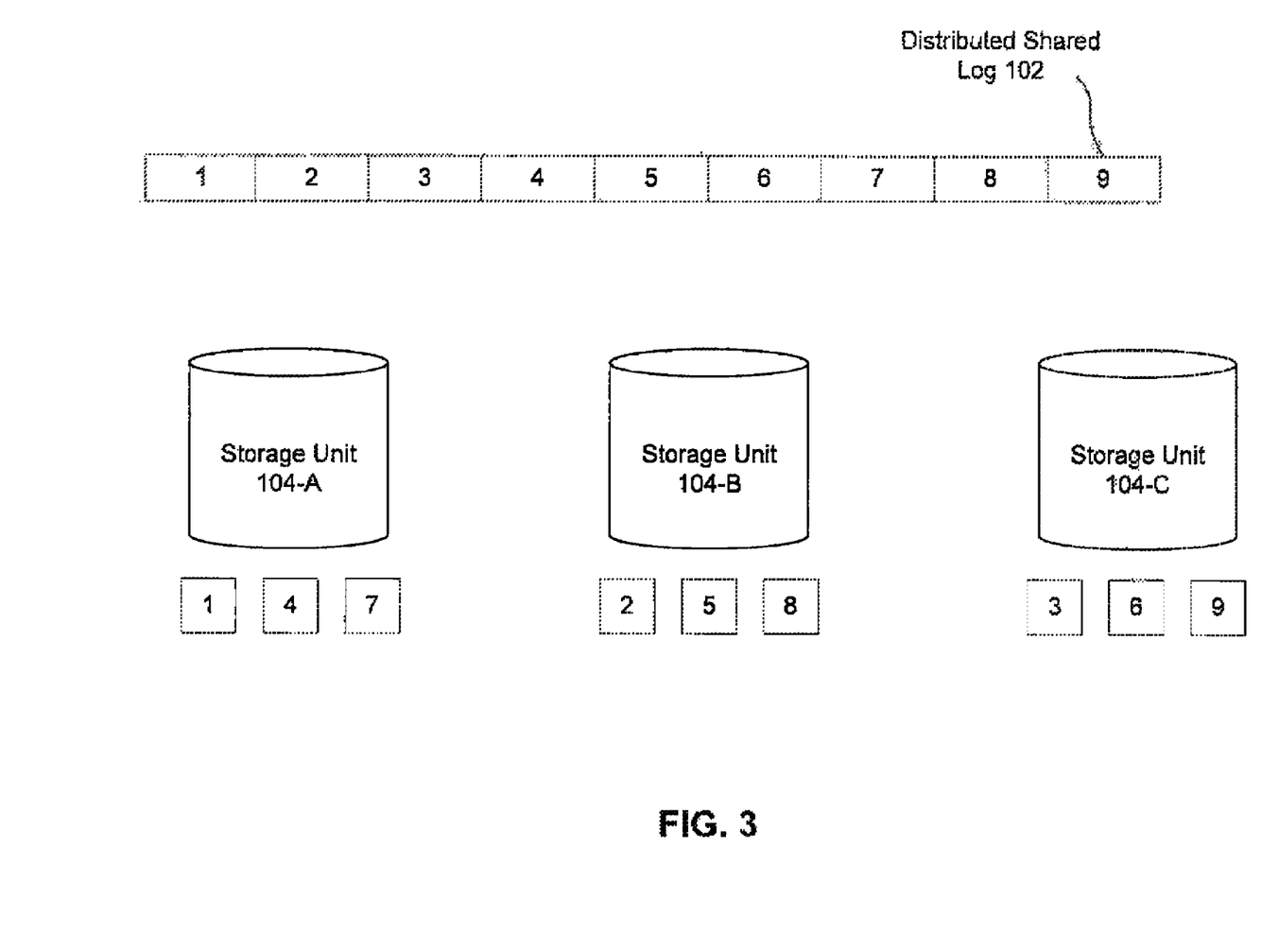
FIG. 3 illustrates an example of striping a distributed shared log across storage units in the distributed shared log architecture of FIG. 1, according to an example embodiment.

FIG. 3 illustrates an example of striping distributed shared log 102 across storage units 104 in the distributed shared log architecture of FIG. 1, according to an example embodiment. FIG. 3 illustrates striping distributed shared log 102 across three storage units, e.g. storage units 104-A, 104-B and 104-C. Client 108 may access distributed shared log 102 from storage units 104-A, 104-B and 104-C over network 106 as discussed above.

As illustrated in FIG. 3, distributed shared log 102 comprises nine log entries. Each log entry has a global logical log address, e.g. 1 to 9. In other words, each log entry is part of a single global logical log address space with each log entry having a different global logical log address.

The log entries corresponding to global logical log addresses 1, 4, and 7 are stored at storage unit 104-A. The log entries corresponding to global logical log addresses 2, 5, and 8 are stored at storage unit 104-B. The log entries corresponding to global logical log addresses 3, 6, and 9 are stored at storage unit 104-C. Thus, while the log entries: are stored at different storage units, client 108 may access distributed shared log 102 as a single globally addressable log.

Striping global logical log addresses over multiple storage units 104 allows high write bandwidth of sequential log entries. This is because sequential log entries may be written by client 108 to different storage units in parallel. By way of a non-limiting example, the log entries corresponding to global logical log addresses 1 to 3 may be written by client 108 to storage units 104-A, 104-B and 104-C respectively in parallel.

While striping allows high write bandwidth of sequential log entries, distributed shared log 102 still provides ordered log writes as a remote network service to client 108. This is because distributed shared log 102 is a single globally addressable log even though it is physically distributed across storage units 104-A, 104-B and 104-C.

Striping also allows sequential log entries to be be read from different storage units 104 in parallel. For example, client 108 may respectively read the log entries corresponding to global logical log addresses 4-6 from storage units 104-A, 104-B and 104-C in parallel.

In an embodiment, one set of storage units 104 may be used for stripping and another set of storage units 104 may be used for mirroring. Specifically, a stripe or set of log entries stored at a storage unit 104 in the set of storage units 104 being used for stripping may be replicated one or more times to another set of storage units 104 acting as mirrors. This gives fault tolerance in case one of the storage units in the set of storage units 104 being using for stripping suffers a catastrophic fault.

In an embodiment for mirroring, a write by client 108 to distributed shared log 102 is not acknowledged to client 108 until the write is persistent on all storage units 104 acting as mirrors. As would be appreciated by a person of ordinary skill in the art, replication of a stripe to one or more storage units 104 acting as mirrors may performed by the storage units 104 acting as mirrors or by client 108.

In an embodiment for mirroring, a read by client 108 of distributed shared log 102 May be sent to any storage unit 104 acting as a mirror if it is fully durable. This property of being fully durable enables storage units 104 acting as mirrors to enhance fault-tolerance and to distribute read-load across storage units 104.

In an embodiment, client 108 contacts a sequencer in order to determine the global logical address in which to write in distributed shared log 102 to which to write. In an embodiment, a sequencer can be a standalone component. In another embodiment, a sequencer may be integrated as part of the transaction processing logic of distributed shared log architecture 100.

In an embodiment, client 108 determines the storage units 104 containing particular log entries by consulting a cluster configuration data structure on client 108. Specifically, the cluster configuration data structure maps the global logical log addresses of the particular log entries to a particular storage unit 104. Client 108 may then request the log entries with these global logical log addresses from the particular storage units 104.

The cluster configuration data structure may be a file on client 108 that maps particular global logical log address ranges in distributed shared log 102 to corresponding storage units 104. The cluster configuration data structure may be consistently replicated to multiple clients (e.g. client 108) over network 106 by storage units 104.

Because distributed shared log 102 provides a single globally addressable log, it provides a total ordering over log writes. But a single globally addressable log may incur high network usage and high client processing time. In order to increase throughput, distributed shared log 102 may provide multiple logical log streams which reduce network usage and decrease client processing time by having the storage units cull unnecessary log entries before sending them to client 108.

As discussed above, each log entry in distributed shared log 102 may record events to one or more objects. However, client 108 may only operate on a small number of objects among the total number of objects in the log. Network utilization may be improved, and the amount of time required to replay log entries may be reduced, by allowing client 108 to pull events related only to objects client 108 is operating on from distributed shared log 102.

In order to improve network utilization and reduce the time needed to replay log entries, distributed shared log 102 may be represented as a set of logical log streams. Client 108 may then operate on distributed shared log 102 using logical log streams.

A logical log stream is the sequence events in distributed shared log 102 for a particular object. In other words, each log entry that records events to multiple objects during a transaction can span multiple logical log streams. For example, in FIG. 2, log entry 1 may be included in two logical log streams, one for object A and one for object B. Each logical log stream for distributed shared log 102 may be assigned a stream identifier.

Logical log streams may improve network utilization because they enable client 108 to receive only the log entries related to the objects it is actually interested in. Moreover, logical log streams may reduce the amount of time required to replay log entries because only events of interest need to be replayed.

Logical log streams may be hosted by running separate independent log instances. In other words, there may be an independent log instance for each logical log stream. While multiple independent log instances allows for improved network utilization and a reduction in the amount of time required to replay log entries, it does not provide for a total ordering of writes across logical log streams.

Ordered writes across logical log streams occurs where a log entry records events to multiple objects during a transaction. For example, in FIG. 2, log entry 1 modifies objects A and B. Multiple independent log instances do not provide a total order over log writes across logical log streams because the events are recorded separately in each independent log instance based on object.

Figure 4:
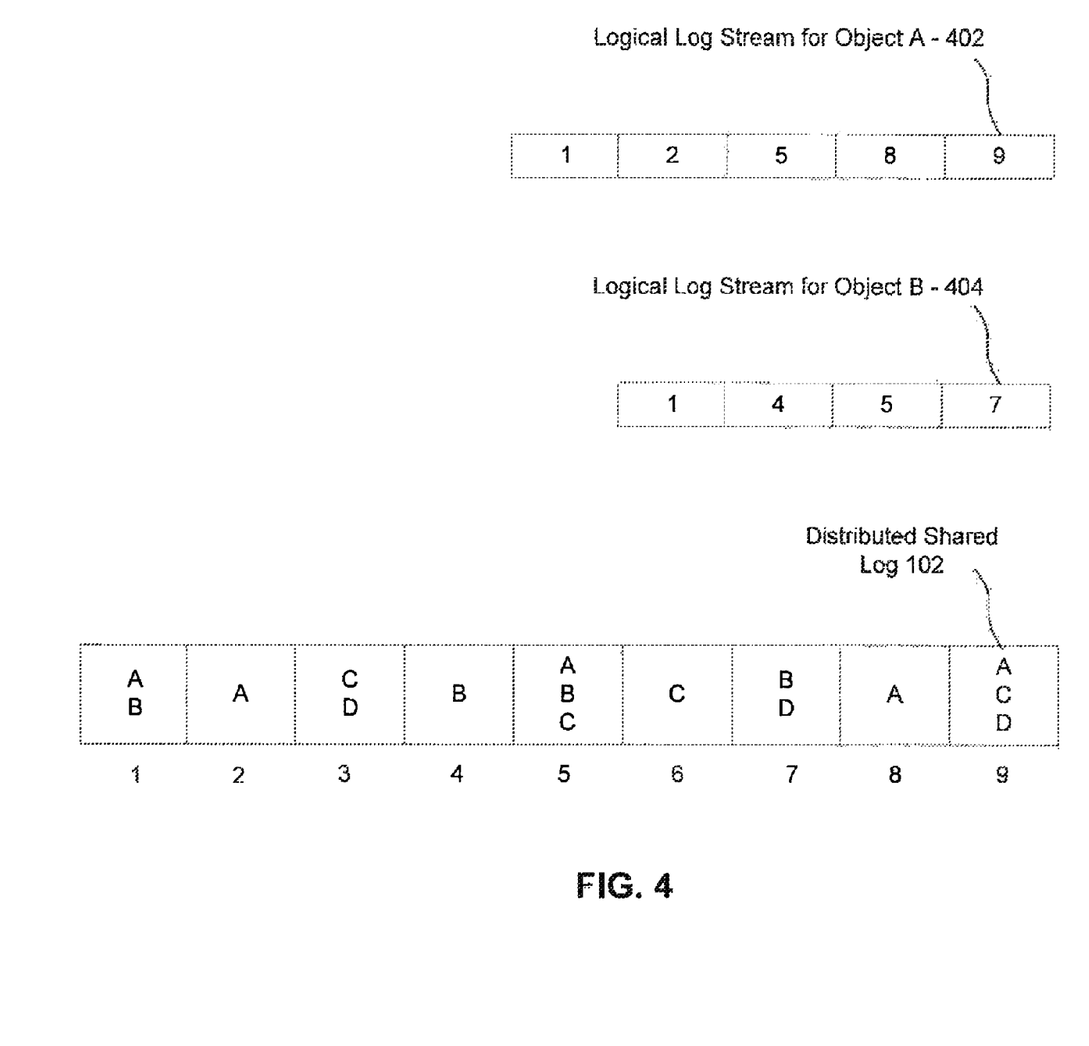
FIG. 4 illustrates a distributed shared log with multiple logical log streams that retains a total order over log writes, according to the example embodiment in FIG. 1.

FIG. 4 illustrates distributed shared log 102 with multiple logical log streams that retains a total order over log writes, according to the example embodiment in FIG. 1. FIG. 4 includes distributed shared log 102 as described in FIG. 1 and logical log streams 402 and 404.

As described above with respect to FIG. 2, each log entry in distributed shared log 102 may record events to one or more objects. For example, log entry 3 records changes to objects B and C. Thus, each log record may also be associated with multiple logical log streams. For example, log entry 5 may be associated with three logical log streams, e.g. logical log streams for objects A, B and C, respectively. In an embodiment, the number of logical log streams may be limited only by the total number of objects. In other words, the number of logical streams may be arbitrary.

In an embodiment, each logical log stream may have a unique stream identifier associated with it. This stream identifier may be used to identify the log entries associated with logical log streams on storage units 104.

As discussed above, providing multiple logical log streams for distributed shared log 102 improves network utilization and reduces the time required to replay transactions. However, the embodiment of FIG. 4 also retains a total order over log writes.

This is accomplished by storing metadata at storage units 104. In an embodiment, this metadata may be stored in main-memory of storage units 104 in order to accelerate scan performance. In an embodiment, this metadata may also be stored persistently at storage units 104.

In an embodiment, writes by client 108 to distributed shared log 102 are annotated with a set of stream identifiers identifying the logical log streams being written to. These stream identifiers are reflected in this metadata hosted at storage units 104.

In an embodiment, storage units 104 may use this metadata to map a range of global logical log addresses for particular logical log streams to the appropriate physical blocks on storage units 104 that contain the associated log entries. In other words, client 108 can request log entries for a particular logical log stream by having storage units 104 perform a scan of the metadata.

Scanning the metadata at storage units 104 exploits advances in computer hardware and networking technology. Specifically, pushing scan operations to storage units 104 to retrieve log entries for particular logical log streams is often feasible because storage units 104 may have large main-memories to store the metadata, multicore CPUs to perform a scan of the metadata, and are connected to client 108 over network 106 which may be high bandwidth and have low latency.

In addition, the embodiment of FIG. 4 retains a total ordering over log writes to distributed shared log 102 because distributed shared log 102 has a single global logical log address space. This is true even with an arbitrary number of logical log streams.

Figure 5:
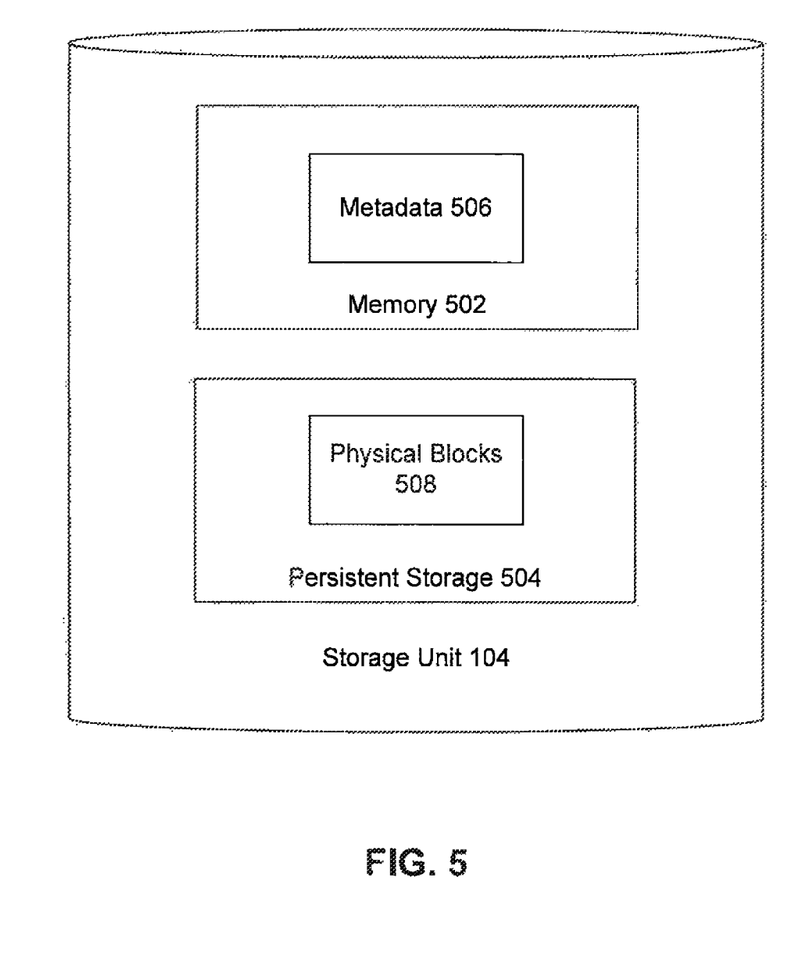
FIG. 5 is a block diagram of a storage unit that supports multiple logical log streams for a distributed shared log while retaining a total order over log writes, according to the example embodiment of FIG. 1.

FIG. 5 is a block diagram of storage unit 104 that supports multiple logical log streams for distributed shared log 102 while retaining a total order over log writes, according to the example embodiment of FIG. 1. FIG. 5 includes storage unit 104 from FIG. 1. Storage unit 104 includes memory 502 and persistent storage 504.

In an embodiment, memory 502 is a main-memory of storage unit 104. For example, memory 502 may be Random Access Memory (RAM). Memory 502 may store metadata 506. In an embodiment, metadata 506 may also be persistently stored in persistent storage 506. Metadata 506 may be persistently stored to persistent storage 306 so it can be recovered in case of a crash of storage unit 104.

In an embodiment, metadata 506 may contain metadata that maps a range of global logical log addresses for a particular logical log stream to physical blocks 508 in persistent storage 504 on storage unit 104. This range of global logical log address corresponds to log entries in distributed shared log 102. In another embodiment, metadata 506 may contain metadata that maps a range of global logical log addresses for a set logical log streams to physical blocks 508 in persistent storage 504 on storage unit 104. As would be appreciated by a person of ordinary skill in the art, metadata 506 may be an index organized by logical log stream identifiers. By keeping metadata 506 in memory 502, log scan performance may be accelerated.

In an embodiment, metadata 506 enables distributed shared log 102 to support variable sized log entries. Specifically, metadata 506 may track both the size of the payload of a log entry and the physical blocks 508 it consumes on persistent storage 504.

Persistent storage 504 is a persistent storage. In other words, data may be stored without power in persistent storage 504. For example, persistent storage 504 may be a hard disk drive or a solid state drive. Persistent storage 504 stores physical blocks 508 representing log entries in distributed shared log 102. As would be appreciated by a person of ordinary skill in the art, physical blocks 508 may represent one or more log entries in distributed shared log 102. Furthermore, physical blocks 508 may be stored on persistent storage 504 in various ways.

In an embodiment, client 108 requests from storage unit 104 a range of global logical log addresses for a particular logical log stream using the logical log stream identifier associated with particular logical log stream. Storage unit 104 locates the log entries associated with the particular logical log stream by scanning metadata 506 for the requested range of global logical log addresses based on the logical log stream identifier. Based on the scanning, storage unit 104 may locate physical blocks 508 on persistent storage 504 that correspond to the requested log entries for the particular logical log stream. In an embodiment, a multicore CPU may enable storage unit 104 to scan metadata 506 more quickly, and thus return the requested log entries to client 108 more quickly.

As discussed above, because storage unit 104 uses metadata 506 to map a range of global logical log addresses for one or more logical log streams to log entries in a single globally addressable log, e.g. distributed shared log 102, a total ordering over log writes may be retained while supporting high throughput using multiple logical log streams.

By pushing scan operations to storage unit 104, logical log streams can be reconstructed while still retaining over a total order over writes across multiple log streams. Pushing scan operations to storage unit 104 may also reduce network usage.

In an embodiment, pushing the scan operation to storage unit 104 may be feasible because of advances in hardware and networking technology. In particular, main memory 502 in storage unit 104 may be able to store large amounts of metadata. Moreover, a multicore CPU in storage unit 104 may be fast enough to perform on demand scanning of metadata 506 in main memory 502. Finally, this may be feasible because network 106 may have high bandwidth and low latency. Thus, client 108 can issue scan requests to storage units 104 via network 106.

In an embodiment, distributed shared log architecture 100 may split log writes across two or more logical storage tiers. For example, this may allow very large log writes to be written to a second storage tier (e.g. a heap store) in parallel while smaller log writes to a first storage tier need only reference the larger data segments in the second storage tier.

This may be beneficial for certain database applications. This is because transactions such as bulk inserts or full table updates that involve large log writes can be offloaded to the second storage tier. As a result, in an embodiment, just small commit log entries need to be written to the first storage tier during database commit operations. This may be especially helpful because locks are held during the critical database commit operation which prevents other operations from proceeding. By only having to write small commit log entries during this phase the database management system can execute more operations.

As would be appreciated by a person of ordinary skill in the art, the number of storage tiers chosen may depend on the size of the log write being performed and the type of application. Furthermore, as would be appreciated by a person of ordinary skill in the art, log writes may be written to storage tiers based on the storage sizes and performance characteristics of the storage tiers. For example, fixed size log entries may be stored in a storage tier having fast read and write performance but a small amount of storage. On the other hand, variable size log entries of several gigabytes may be stored in storage tiers with slow read and write performance but a large amount of storage. For example, a storage tier that stores variable sized log entries may be a distributed file system.

Figure 6:
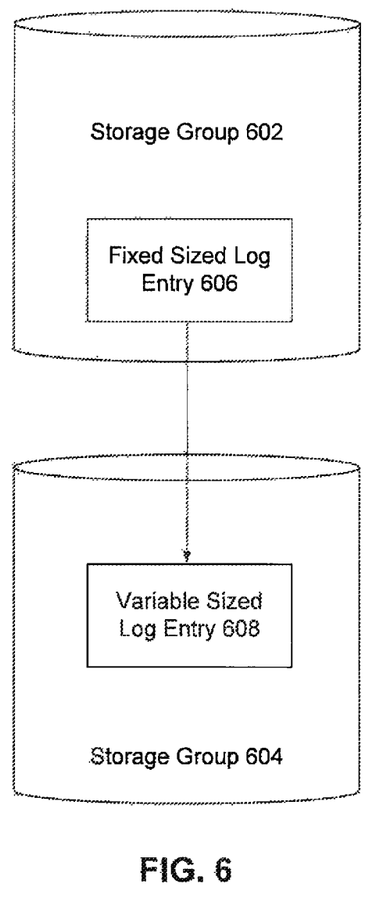
FIG. 6 is a block diagram of a distributed shared log architecture supporting variable size log entries, according to the example embodiment in FIG. 1.

FIG. 6 is a block diagram of distributed shared log architecture 100 supporting variable size log entries, according to the example embodiment in FIG. 1. As would be appreciated by a person of ordinary skill in the art, this embodiment may be combined with the log striping embodiment in FIG. 3.

FIG. 6 includes storage groups 602 and 604. Storage groups 602 and 604 represent logical storage tiers and contain log entries from distributed shared log 102. In an embodiment, the log entries in storage groups 602 and 604 may be stored in storage units 104. In other words, the log entries are logically stored in storage groups 602 and 604 but are physically stored in storage units 104. In another embodiment, storage group 604 may perform storage using a distributed file system.

The log entries in distributed shared log 102 may be represented as a combination of fixed size log entry 606 and variable sized log entry 608. Storage group 602 may store a fixed sized log entry 606, e.g. the fixed size portion of a log entry from distributed shared log 102. Storage group 604 may store a variable sized log entry 608, e.g. the variable sized portion of the same log entry from distributed shared log 102.

Fixed sized log entry 606 may of small size, e.g. a 512 bytes. Because they are of small size and fixed in size they may be written to quickly. This is often advantageous for database commit transactions in which log entries must be written quickly in order to ensure the database is responsive and has high transaction throughput. Moreover, keeping fixed size log entries 606 the same size in storage group 602 may minimize the variance in latency between writes to storage group 602.

On the other hand, variable sized log entry 608 may be of large size, e.g. several gigabytes. For example, a full table update of a database may be represented using a variable sized log entry 608. Because they are of large variable size, they may not be written to quickly.

Fixed sized log entry 606 may contain a pointer to a variable sized log entry 608 that contains the variable size portion of the of the log entry. The pointer may be a global logical log address. This is possible because any log entry in distributed shared log 102 can be uniquely identified using a global log address no matter what storage group it is in.

In an embodiment, when using multiple storage groups, the global logical log address space may be partitioned according to the number of storage groups. Moreover, in an embodiment, there may be separate address spaces for each storage group with a consistent way to refer to an logical log address across all storage groups.

Specifically, in an embodiment, the global logical log address of a log entry in distributed shared log 102 may comprise a storage group identifier and a log entry number. For example, a fixed sized log entry 606 in storage group 602 may have a storage identifier of 1 and log entry number of 5 while the corresponding variable sized log entry 606 in storage group 604 may have a storage identifier of 2 and log entry number of 5.

When client 108 performs a variable size log write, it may write fixed sized log entry 606 to storage group 602 and variable sized log entry 608 to storage group 604. Fixed size log entry 606 may contain a pointer to the variable size portion of the log entry in storage group 604 as represented by variable size log entry 608. As discussed above, fixed size log entry 606 and variable size log entry 608 would have the same log entry number but have different storage group identifier numbers for their global logical log addresses. This is possible because distributed shared log 102 has a single global logical log address space.

As discussed above, a log entry may be split into fixed sized log entry 606 and variable sized log entry 608. In an embodiment, the large variable sized portion of the log entry is written first to storage group 604. After the write to storage group 604 completes, along with any replication to mirrors, the global logical log address for the log entry is then written to storage group 602. By writing this global logical log address to storage group 602, it can be followed to storage group 604 in a manner analogous to following a pointer.

Figure 7:
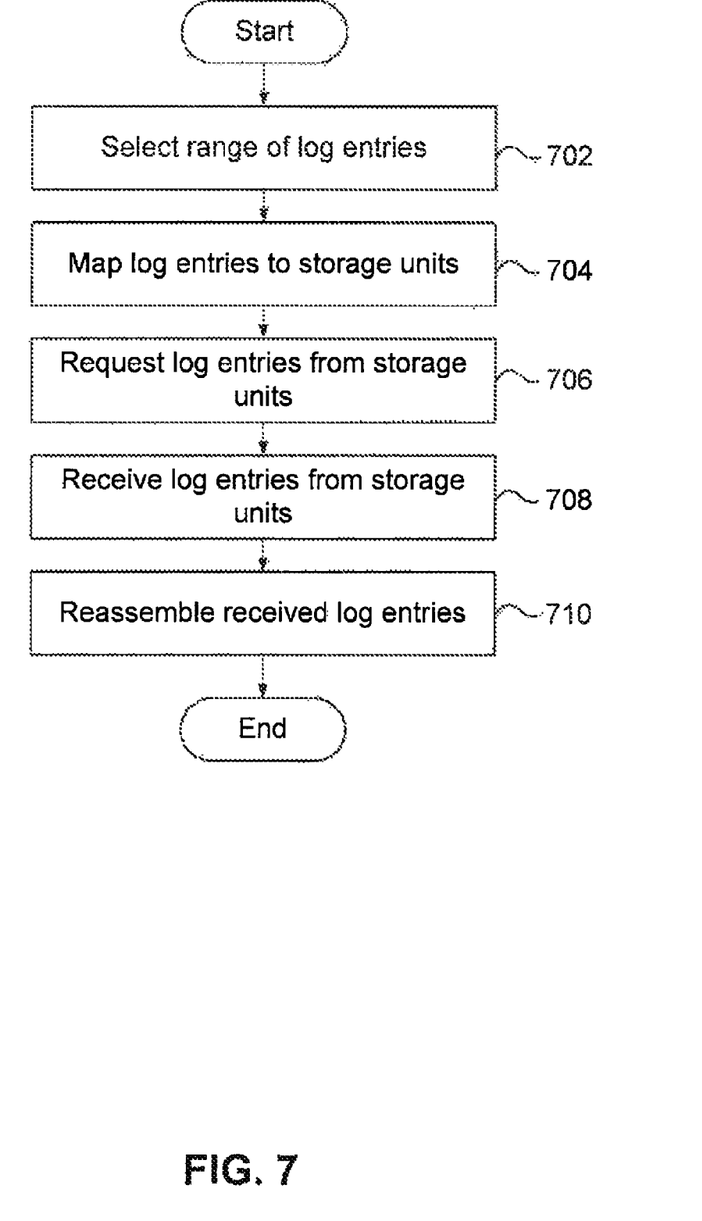
FIG. 7 is a flowchart illustrating a process for accessing a distributed shared log in the distributed shared log architecture of FIG. 1, according to an example embodiment.

FIG. 7 is a flowchart for a method 700 for accessing distributed shared log 102, according to the example embodiment in FIG. 1. Method 700 can be performed by processing logic that can comprise hardware (e.g., circuitry, dedicated logic, programmable logic, microcode, etc.), software (e.g., instructions run on a processing device), or a combination thereof.

In step 702, client 108 selects a range of logical log addresses for log entries from distributed shared log 102. In another embodiment, client 108 may select a range of logical log addresses for a logical log stream from distributed shared log 102.

In step 704, client 108 maps the selected range of logical log addresses from distributed shared log 102 to one or more storage units 104. Specifically, client 108 determines which storage units 104 store the selected range of logical log addresses. As would be appreciated by a person of ordinary skill in the art, this may be determined by checking a cluster configuration data structure that maps logical log address ranges in distributed shared log 102 to corresponding storage units 104 containing log entries corresponding to the logical log address ranges. In an embodiment, client 108 may map the range of logical log addresses to multiple storage units 104 based on distributed shared log 102 being striped across the multiple storage units 104.

In step 706, client 108 requests the selected range of logical log addresses from the determined storage units 104 in step 704. In another embodiment, client 108 may select the range of logical log addresses for a logical log stream from distributed shared log 102. In another embodiment, client 108 may select the range of logical log addresses for a set of logical log streams from distributed shared log 102. In an embodiment, client 108 may issue requests for the selected range of logical log addresses in parallel to multiple storage units 104 based on distributed shared log 102 being striped across multiple storage units 104.

Storage units 104 may process the requests for the selected log entries based on a mapping to the corresponding physical blocks 508 on persistent storage 504. Specifically, storage units 104 may process the requests by maintaining metadata 506 in memory 502. Storage units 104 may scan metadata 506 based on the selected log entries.

In another embodiment, storage units 104 may process the requests for the selected log entries for a logical log stream based on a mapping to the corresponding physical blocks 508 on persistent storage 504. Specifically, storage units 104 may process the requests by maintaining metadata 506 in memory 502. Storage units 104 may scan metadata 506 based on the selected log entries for a logical log stream. Storage units 104 may filter log entries that do not contain information about the particular object of the associated logical log stream. Storage units 104 may also filter event information from log entries that pertains to objects that are not related to the particular object of the associated logical log stream.

In step 708, client 108 receives the log entries for the selected range of logical log addresses from storage units 104. In an embodiment, when client 108 requests log entries for a particular logical log stream, client 108 may receive only those relevant log entries. Similarly, when client 108 requests log entries for a particular logical log stream, client 108 may receive only that event information that pertains to the particular object of the associated logical log stream.

In step 710, client 108 reassembles the received log entries. This may occur as a result of the received log entries being striped across multiple storage units 104. As a result, the log entries may be received in parallel and out of order from storage units 104. Thus, client 108 may have to reassemble the log entries in the proper order based on their logical log addresses.

In an embodiment, the requested log entries may be stored over multiple storage groups, e.g. storage groups 602 and 604. Specifically, a log entry may be represented as a combination of a fixed sized log entry 606 and a variable sized log entry 608. Fixed size log entry 606 may be stored in a different storage group than variable sized log entry 608. Moreover, fixed sized log entry 606 may contain logical log address pointer to the corresponding event information in variable sized log entry 608. For example, fixed sized log entry 606 in storage group 602 may contain a logical log address pointer to an entire table update change information in variable sized log entry 608 stored in storage group 604. Client 108 may request the corresponding variable sized log entry 608 change information by following the logical log address pointer in the received fixed sized log entry 606. Client 108 may be perform this by consulting a cluster configuration data structure for the particular logical log address stored in the fixed sized log entry 606 as discussed above.

Figure 8:
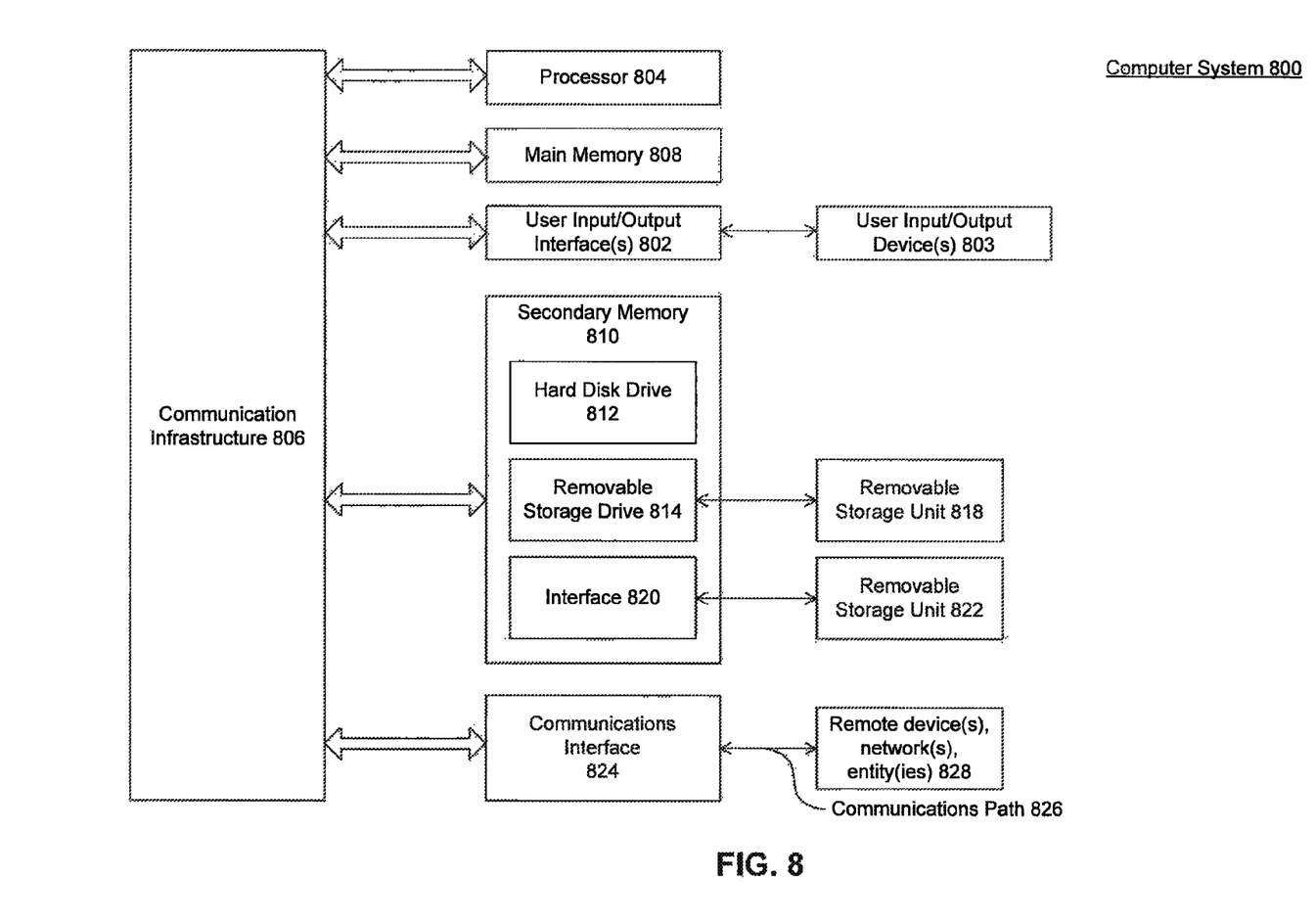
FIG. 8 is an example computer system useful for implementing various embodiments.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized: electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein, Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for accessing a distributed shared log, comprising:
   selecting, by at least one processor, a range of log entries for a logical log stream from the distributed shared log, the distributed shared log being distributed over a plurality of storage units, the distributed shared log associated with a plurality of logical log streams, and the distributed shared log providing ordered writes across the plurality of logical log streams;
   mapping, by the at least one processor, the selected range of log entries to associated storage units in the plurality of storage units;
   requesting, by the at least one processor, the selected range of log entries from the associated storage units based on the mapping, wherein the selected range of log entries are stored according to metadata at the associated storage units;
   receiving, by the at least one processor, the selected range of log entries from the associated storage units based on the requesting; and
   reassembling, by the at least one processor, the received selected range of log entries for the logical log stream.

2. The method of claim 1, wherein the associated storage units provide the selected range of log entries in parallel.

3. The method of claim 1, wherein consecutive segments of the selected range of log entries are stored at different storage units in the plurality of storage units.

4. The method of claim 1, wherein the selected range of log entries are stored using a first storage tier and a second storage tier.

5. The method of claim 4, wherein the second storage tier is a distributed file system.

6. The method of claim 4, wherein a log entry from the selected range of log entries stored in the first storage tier contains a pointer to an associated log entry in the second storage tier.

7. The method of claim 1, wherein the associated storage units retrieve the selected range of log entries by scanning the metadata based on the logical log stream of the selected range of log entries.

8. The method of claim 1, wherein the distributed shared log supports an arbitrary number of logical log streams.

9. The method of claim 1, wherein the selected range of log entries are persistently stored with the metadata at the associated storage units based on the mapping.

10. A system, comprising:
a memory; and
at least one processor coupled to the memory and configured to:
- select a range of log entries for a logical log stream from a distributed shared log, the distributed shared log being distributed over a plurality of storage units, the distributed shared log associated with a plurality of logical log streams, and the distributed shared log providing ordered writes across the plurality of logical log streams;
- map the selected range of log entries to associated storage units in the plurality of storage units;
- request the selected range of log entries from the associated storage units based on the mapping, wherein the selected range of log entries are stored according to metadata at the associated storage units;
- receive the selected range of log entries from the associated storage units based on the requesting; and
- reassemble the received selected range of log entries for the logical log stream.

11. The system of claim 10, wherein the associated storage units provide the selected range of log entries in parallel.

12. The system of claim 10, wherein consecutive segments of the selected range of log entries are stored at different storage units in the plurality of storage units.

13. The system of claim 10, wherein the selected range of log entries are stored using a first storage tier and a second storage tier.

14. The system of claim 13, wherein the second storage tier is a distributed file system.

15. The system of claim 13, wherein a log entry from the selected range of log entries stored in the first storage tier contains a pointer to an associated log entry in the second storage tier.

16. The system of claim 10, wherein the associated storage units retrieve the selected range of log entries by scanning the metadata based on the logical log stream of the selected range of log entries.

17. The system of claim 10, wherein the selected range of log entries are stored on a persistent storage with the metadata at the associated storage units based on the mapping.

18. A tangible computer-readable device having instructions stored thereon that, when executed by at least one computing device, causes the at least one computing device to perform operations comprising:
- selecting a range of log entries for a logical log stream from the distributed shared log, the distributed shared log being distributed over a plurality of storage units, the distributed shared log associated with a plurality of logical log streams, and the distributed shared log providing ordered writes across the plurality of logical log streams;
- mapping the selected range of log entries to associated storage units in the plurality of storage units;
- requesting the selected range of log entries from the associated storage units based on the mapping, wherein the selected range of log entries are stored according to metadata at the associated storage units;
- receiving the selected range of log entries from the associated storage units based on the requesting; and
- reassembling the received selected range of log entries for the logical log stream.

19. The computer-readable device of claim 18, wherein the associated storage units provide the selected range of log entries in parallel.

20. The computer-readable device of claim 18, wherein consecutive segments of the selected range of log entries are stored at different storage units in the plurality of storage units.

21. The computer-readable device of claim 18, wherein the selected range of log entries are stored using a first storage tier and a second storage tier.

22. The computer-readable device of claim 18, wherein the associated storage units retrieve the selected range of log entries by scanning the metadata based on the logical log stream of the selected range of log entries.

23. The computer-readable device of claim 18, wherein the selected range of log entries are persistently stored with the metadata at the associated storage units based on the mapping.

* * * * *